July 18, 1939.  J. D. STACY  2,166,827
CAPACITOR CIRCUIT
Filed May 11, 1938
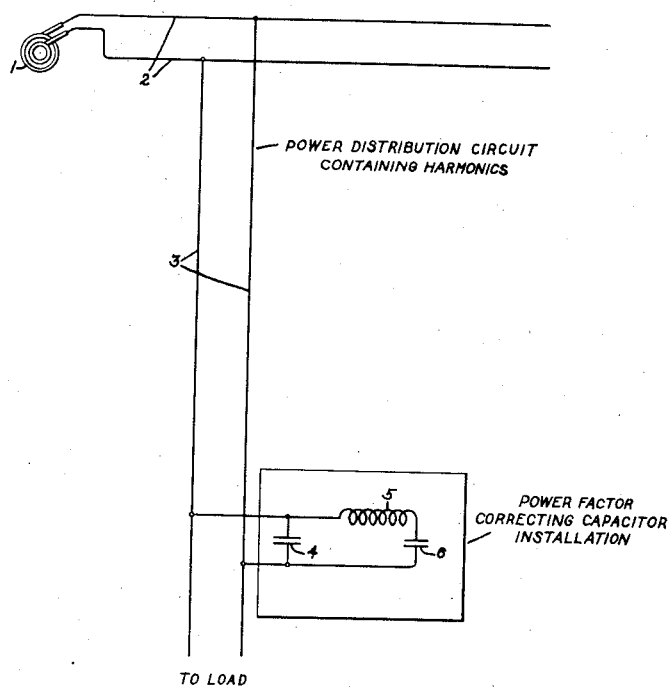
Inventor:
John D. Stacy,
by Harry E. Dunham
His Attorney.

Patented July 18, 1939

2,166,827

UNITED STATES PATENT OFFICE 2,166,827

CAPACITOR CIRCUIT

John D. Stacy, Pittsfield, Mass., assignor to General Electric Company, a corporation of New York Application May 11, 1938, Serial No. 207,274

7 Claims. (Cl. 171—97)

This invention relates to capacitor circuits and has for an object the suppression of harmonic currents in circuits containing a capacitor or capacitors.

Capacitors are often connected in shunt to alternating current power lines for improving the power factor of the current in the line. However, when the voltage of such lines contains higher harmonics such as the third, fifth, seventh or ninth harmonics, the capacitor offers a relatively low impedance path for currents produced by these harmonic voltages with the result that the power line carries these harmonic currents. These high frequency harmonic currents are often undesirable as they cause inductive interference with neighboring communication circuits, such as telephone lines paralleling the power line and may even overload the power distribution, transmission and generation equipment.

In accordance with this invention I eliminate the flow of these harmonic currents in a circuit containing either a shunt capacitor or a series capacitor by dividing the capacitor installation into at least two parallel-connected capacitors and connecting a properly proportioned reactor in series with one of the capacitors.

When only one troublesome harmonic frequency is present, dividing the capacitor into two parallel capacitors is sufficient but if more than one troublesome harmonic frequency exists an additional subdivision of the original capacitor must be made for each additional harmonic present.

When capacitors are applied to power systems there is always some system inductive reactance in series between the source of power and the capacitor. Quite often this system inductive reactance is sufficient to approach series resonance with the capacitor at the harmonic frequency and thus amplify the harmonic currents which will flow. This situation has often limited the amount of power factor correcting capacitors which could be put on a power feeder, since, in general, the constants of feeders are such that as we increase the rating of the capacitor we approach the fifth harmonic resonant condition.

This situation has also caused excessive harmonic loads to be taken by the capacitor with occasional cases of overheating and operation of fuses or other protective equipment. However, installations arranged in accordance with this invention are free from the series resonance condition with system inductive reactance and, therefore, the full amount of power factor correction can satisfactorily be installed.

The invention will be better understood from the following description taken in connection with the accompanying drawing and its scope will be pointed out in the appended claims.

Referring now to the single figure of the accompanying drawing, wherein I show diagrammatically an embodiment of my invention, an alternating current generator 1 is connected to energize a supply bus 2 to which is connected an alternating current power line or distribution circuit 3 for supplying power to any suitable load or loads. Connected in shunt to the power line is a capacitor 4 and connected in shunt with the capacitor 4 is a series circuit comprising a reactor 5 and a second capacitor 6.

The reactor 5 and the capacitor 6 have such relative reactance values that, at any particular harmonic frequency at which it is desired to reduce or suppress the flow of currents of such frequency in the circuit 3, the inductive reactance of the reactor exceeds the capacitative reactance of the capacitor. As the sign of the inductive reactance is opposite to that of the capacitative reactance, the result is that the effective or equivalent reactance of the branch which includes the reactor 5 and the capacitor 6 is that of an inductive reactance. Consequently, it will draw a lagging harmonic current from the line 3, whereas the capacitor 4 will draw a leading harmonic current from the line and as these currents are 180° out of phase, they will subtract arithmetically from each other. For best results, the effective or equivalent inductive reactance of the branch circuit should be exactly equal to the capacitative reactance of capacitor 4 at the frequency of the harmonic which is to be suppressed. Under these conditions, the lagging current taken by the branch circuit is equal to the leading current taken by the capacitor 4 so that the line will carry no current of the harmonic frequency which is to be suppressed. Under these ideal conditions the capacitor installation exhibits parallel resonance and offers substantially infinite impedance to the flow of the particular harmonic current which is to be suppressed.

To take a specific example, suppose the fundamental frequency of the power line 3 is 60 cycles per second and that the voltage of this line contains a pronounced fifth harmonic (300 cycles per second). Assume further that the necessary shunt capacitative reactance for power factor correcting purposes is 4.79 units at the fundamental frequency of the circuit. With respect to the fifth harmonic an ordinary shunt capacitor installation of this value would have a capacitative reactance of .96 unit, thus, offering a very low impedance to fifth harmonic currents. In accordance with my invention, such a simple capacitor installation would be replaced by the one shown diagrammatically in the drawing in which at 60 cycles per second, capacitors 4 and 6 might have values of 10 units and reactor 5 might have a value of 0.8 unit. The branch circuit would then have a capacitative reactance of 9.2 units. This when combined with the parallel capacitor 4 having a value of 10 units would give a resultant capacitative reactance of 4.79 units. Therefore, at 60 cycles this combination circuit would be the equivalent of the required ordinary shunt capacitor installation. However, with respect to the fifth harmonic, capacitors 4 and 6 would have capacitative reactance values of 2 units and reactor 5 would have an inductive reactance value of 4 units. Consequently, the branch circuit consisting of the reactor 5 and capacitor 6 would have an equivalent inductive reactance of 2 units and would, therefore, draw the same amount of lagging current at the fifth harmonic frequency as the capacitor 4 draws leading current at this same harmonic frequency with the result that the combination draws no fifth harmonic current and, thus, the combination offers substantially infinite impedance of the fifth harmonic, whereas, as has been explained above, an equivalent 60 cycle capacitor would offer only .96 unit.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In an alternating current power system, a power line whose voltage contains a substantial higher harmonic component, a capacitor connected thereto, and means for suppressing the flow of current in said circuit at the frequency of said harmonic comprising a shunt for said capacitor containing a reactor and a second capacitor in series, said reactor having a higher reactance than said second capacitor at said harmonic frequency.

2. In combination, a 60 cycle alternating current power system containing a pronounced higher harmonic voltage component, a power factor correcting capacitor installation connected in shunt to said circuit, said installation comprising a pair of parallel connected capacitors, and a reactor connected in series with one of said capacitors.

3. A capacitor installation for suppressing the flow of harmonic currents comprising a pair of parallel connected capacitors, and a reactor connected in series to one of said capacitors, said reactor having a higher reactance value than its series connected capacitor at the harmonic frequency which it is desired to suppress.

4. A harmonic current suppressing capacitor installation comprising a pair of parallel connected capacitors, and a reactor connected in series with one of said capacitors, said reactor having a lower inductive reactance than its series connected capacitor at the fundamental frequency at which said installation is adapted to operate, said reactor having a higher inductive reactance than its series connected capacitor at the harmonic frequency which it is desired to suppress.

5. A harmonic current suppressing capacitor installation comprising a pair of parallel connected equal capacitors, and a reactor connected in series with one of said capacitors, said reactor having a lower inductive reactance than its series connected capacitor at the fundamental frequency at which said installation is adapted to operate, said reactor having a reactance value of twice the capacitative reactance value of its series connected capacitor at the harmonic frequency which it is desired to suppress.

6. In combination, a 60 cycle power line containing a pronounced fifth harmonic, a shunt connected power factor correcting capacitor installation for said circuit, said installation comprising a capacitor connected across said circuit and a branch circuit connected in parallel with said capacitor, said branch circuit containing a reactor and a second capacitor connected in series, said reactor having such a value relative to said second capacitor that at the fifth harmonic frequency the effective reactance of said branch circuit is equal but opposite in sign to the effective reactance of the first capacitor.

7. The combination with an alternating current power system of the type having a relatively low power factor power line containing a pronounced higher harmonic frequency voltage component of a capacitor installation connected in shunt with said circuit for correcting said power factor while substantially preventing any accentuation of the flow of current at said harmonic frequency in said circuit caused by the presence of said shunt capacitor installation comprising, a pair of parallel branch circuits each containing a capacitor, and a reactor connected in series in one of said branch circuits, the capacitance of said capacitors and the inductance of said reactor being so correlated that at the fundamental frequency of said circuit said parallel branches have a resultant capacitive reactance of a value sufficient to provide the desired correction of power factor of said circuit while at said harmonic frequency the branch containing said reactor has a resultant inductive reactance substantially equal to the capacitive reactance of the other branch.

JOHN D. STACY.